(12) United States Patent
Jagannathan et al.

(10) Patent No.: US 11,816,217 B2
(45) Date of Patent: Nov. 14, 2023

(54) DECOY MEMORY ALLOCATION

(71) Applicant: VMware, Inc., Palo Alto, CA (US)

(72) Inventors: Ravi Jagannathan, Palo Alto, CA (US); Glen Robert Simpson, Palo Alto, CA (US)

(73) Assignee: VMWARE, INC., Palo Alto, CA (US)

(*) Notice: Subject to any disclaimer, the term of this patent is extended or adjusted under 35 U.S.C. 154(b) by 334 days.

(21) Appl. No.: 16/845,540

(22) Filed: Apr. 10, 2020

(65) Prior Publication Data
US 2021/0319104 A1    Oct. 14, 2021

(51) Int. Cl.
*G06F 21/56*    (2013.01)
*G06F 3/06*    (2006.01)

(52) U.S. Cl.
CPC .......... *G06F 21/566* (2013.01); *G06F 3/0604* (2013.01); *G06F 3/0631* (2013.01); *G06F 3/0673* (2013.01); *G06F 21/567* (2013.01); *G06F 2221/034* (2013.01)

(58) Field of Classification Search
CPC .... G06F 3/0604; G06F 3/0631; G06F 3/0673; G06F 21/566; G06F 21/567; G06F 2221/034
See application file for complete search history.

(56) References Cited

U.S. PATENT DOCUMENTS

2005/0283770 A1* 12/2005 Karp ............... G06F 11/366 717/151
2007/0089088 A1* 4/2007 Borde .............. G06F 21/52 717/106
2012/0254995 A1* 10/2012 Sallam .............. G06F 21/52 726/22

(Continued)

FOREIGN PATENT DOCUMENTS

JP    2009259078    * 11/2009
JP    2006053760    *  3/2011

OTHER PUBLICATIONS

Birrell's, Eleanor's; "Lecture 1: Buffer Overflows;"Jan. 27, 2017; Cornel.edu; available at: http://www.cs.cornell.edu/courses/cs5431/2017sp/Lec1-BufferOverflows.pdf (Year: 2017).*

(Continued)

*Primary Examiner* — Prasith Thammavong
(74) *Attorney, Agent, or Firm* — Patterson + Sheridan, LLP

(57) ABSTRACT

Certain embodiments described herein relate to methods and systems for detecting unexpected behavior associated with a process. In certain embodiments, a method comprises receiving a memory allocation request, the request indicating one or more memory segments to be allocated in memory of a computing system. The method further comprises allocating the one or more memory segments in the memory based on the memory allocation request. The method further comprises allocating one or more decoy memory segments in the memory based on the memory allocation request. The method further comprises trapping an input/output (I/O) operation. The method further comprises detecting an unexpected behavior associated with the I/O operation based on determining that the I/O operation impacts at least one of the one or more decoy memory segments. The method further comprises performing one or more actions based on the detection.

20 Claims, 4 Drawing Sheets

(56) References Cited

U.S. PATENT DOCUMENTS

| | | | | |
|---|---|---|---|---|
| 2012/0254999 | A1* | 10/2012 | Sallam | G06F 21/566 726/23 |
| 2015/0169869 | A1* | 6/2015 | Deutschle | G06F 21/52 726/22 |
| 2017/0083255 | A1* | 3/2017 | Chiricescu | G06F 21/6209 |
| 2018/0239607 | A1* | 8/2018 | Parker | G06F 9/45533 |
| 2020/0034144 | A1* | 1/2020 | Evers | G06F 9/3016 |
| 2021/0110040 | A1* | 4/2021 | Boivie | G06F 9/30076 |

OTHER PUBLICATIONS

Piromspoa, Krerk's et. al. "Survey of Protections from Buffer-Overflow Attacks;" Apr. 4, 2011; available at: https://patents.google.com/scholar/8845509281943766581?oq=20210319104 (Year: 2011).*

Marco-Gisbert, Hector's et. al. "SSPFA: effective stack smashing protection for Android OS;" Jan. 22, 2019: available at: https://link.springer.com/content/pdf/10.1007/s10207-018-00425-8.pdf (Year: 2019).*

* cited by examiner

DECOY MEMORY ALLOCATION

BACKGROUND

Typically when an attacker compromises a computer system, they attempt to gain control of the computer system. The attacker, in such cases, may use one of many methods, including a method that involves overwriting the computer system's memory beyond a certain set-point in memory (e.g., a stack buffer). One example of such an attack may be known as stack smashing, where a stack buffer overflow is caused deliberately by an attacker. A stack buffer overflow or stack buffer overrun occurs when a program writes to a memory address on the program's call stack outside of the intended data structure, which is usually a fixed-length buffer. Overwriting the computer system's memory beyond a certain set-point typically affects the data that is stored subsequent to the stack buffer or set-point. For example, the overwrite may affect the jump address that a corresponding program jumps to, alter the data, and/or alter a configuration flag, thereby, allowing the attacker to gain control of or manipulate the system. In addition to overwriting, an attack may involve a malicious process issuing a read operation to memory segments that are not allocated to the process.

In certain cases, a non-malicious process or application may issue read/write operations or input/output (I/O) operations to memory segments that are not allocated to the process or application. These I/O operations to such memory segments may be issued as a result of software bugs in the execution code associated with the process or application.

In general, detecting such unexpected behavior, whether malicious or non-malicious, may be challenging.

DETAILED DESCRIPTION

Figure 1:
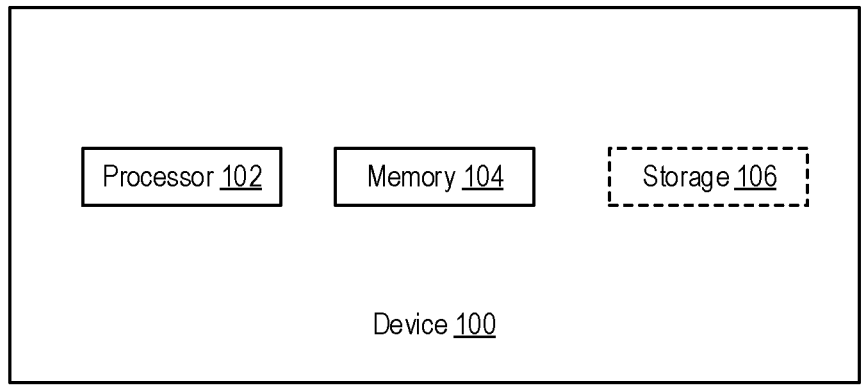
FIG. 1 illustrates a device including a processor, a memory, and an optional storage, according to some embodiments.

Certain embodiments described herein relate to decoy memory allocation techniques for allocating decoy memory segments to detect unexpected behavior taking place in a device, such as a computer system. For example, in certain embodiments, upon receiving a memory allocation request from a process, in addition to allocating memory segments for the process in memory, a processor may also allocate decoy memory segments that are not intended to be used for I/O. Subsequently, in certain embodiments, upon detecting any potential impact (e.g., I/O, such as a read or write) to the decoy memory segments, the processor may detect unexpected behavior. In certain embodiments, impact to the decoy memory segments include any read or write operation directed to the decoy memory segments. Impact to the decoy memory pages may be caused by a malicious or non-malicious application or process. For example, a malicious process may be used by an attacker to read or write to the decoy memory pages, which may be indicative of unexpected behavior (e.g., a security attack). In another example, a non-malicious application or process may attempt to read or write to the decoy memory pages, which may be also indicative of unexpected behavior (e.g., a software bug).

In certain embodiments, a decoy memory allocation scheme, implemented based on the techniques described herein, can be disable and enabled. In certain embodiments, whether the decoy memory allocation scheme is enabled or disabled may be indicated by a configuration flag in memory. For example, when there is an indication that the system is under attack, a decoy memory allocation scheme may be enabled to learn more about the attack and take security measures. When the attack is no longer taking place, the decoy memory allocation scheme may be disabled in order to increase memory utilization and efficiency (e.g., so that the memory segments that would have otherwise been used as decoy, based on the decoy memory allocation scheme, could be used for actual storage of data). Using the decoy memory allocation schemes described herein is advantageous for a number of reasons. For example, instead of shutting a comprised system (e.g., a system under attack) completely down, the decoy memory allocation schemes described herein allow a compromised system to continue to operate. In such cases, identifying and monitoring the unexpected behavior while the system operates may enable, for example, the administrator to learn how the attacker is operating, the implementation details of how the attacker is attempting to gain control of the device, etc. In certain embodiments, when there is an indication that the system is under attack, the decoy memory allocation scheme described herein may be turned on and the system may be used as a "honeypot" to learn more about the attack.

In certain embodiments, with respect to a non-malicious process or application, detecting impact to decoy memory pages may indicate a bug associated with the process or application. The decoy memory allocation scheme described herein, in certain embodiments, may be used in a variety of systems or devices, such as devices with an operating system, devices without an operating system, etc.

FIG. 1 illustrates a device 100 including a processor 102, a memory 104, and an optional storage 106. Processor 102 is generally representative of a single CPU (central processing unit) or multiple CPUs. In the illustrated embodiment, processor 102 retrieves and executes programming instructions stored in memory 104. In certain embodiments, memory 104 is representative of volatile memory, such as random access memory (RAM), which stores instructions and data that may be retrieved by processor 102. In certain embodiments, memory 104 is representative of a combination of RAM and cache. Optional storage 106 may include any combination of disk drives, flash-based storage devices, and the like, and may include fixed and/or removable storage devices, such as fixed disk drives, removable memory cards, caches, optical storage, network attached storage (NAS), or storage area networks (SAN).

In certain embodiments, processor 102 may include an address translation hardware or memory management unit (MMU) that uses a memory management technique, referred to as virtual memory. The MMU maps virtual addresses into physical addresses in memory 102 and/or storage 106. Virtual memory comprises memory pages, each memory page referring to a continuous block of virtual memory. In certain embodiments, memory is assigned to processes and application in the form of memory pages in memory 104.

In certain other embodiments, memory 104 may be assigned in the form of memory slabs. In certain embodiments, a memory slab is a kernel object that allows memory blocks to be dynamically allocated from a designated memory region. In certain embodiments, all memory blocks in a memory slab have a single fixed size, allowing them to be allocated and released efficiently and avoiding memory fragmentation concerns. Memory slabs are then mapped to physical memory 104. In addition to memory pages and memory slabs, other ways of allocating units of memory are also within the scope of this disclosure. For simplicity, a unit of memory, whether it is a memory page, memory slab, a memory block, etc., may hereinafter be referred to as a memory segment. Also, note that, in certain embodiments, processor 102 may not utilize an MMU for memory management and allocating memory segments to processes and application.

As described above, typically an attacker attempting to compromise or gain control of a device, such as device 100, may use a process that is executed by processor 102 to issue I/Os to segments in memory that are not allocated to the process. For example, an attacker may overwrite certain memory segments that are not allocated to the process. In certain embodiments, overwriting memory segments that are not allocated to the process may, for example, be performed by issuing a write operation with a payload and a starting address for writing the payload, where the starting address is somewhere within the memory segments allocated to the process, but the payload is large enough such that writing the payload would require overwriting memory segments not assigned to the process. In another example, the attacker may issue I/Os with starting addresses corresponding to segments of the memory that are not assigned to the process. As one of ordinary skill in the art can appreciate, overwriting memory in such a manner may help the attacker gain control of the device. I/O operations, issued by a process, that impact memory segments not meant to be impacted by the process may be examples of what are referred to herein as unexpected behaviors.

Another example of an unexpected behavior is when a software bug in the execution code of a non-malicious process or application impacts memory segments not meant to be impacted by the process or application. For example, instructions associated with a non-malicious application may inadvertently point (e.g., with pointers) to certain memory segments (e.g., for reading or writing purposes) that are not allocated to the application.

Figure 2A:
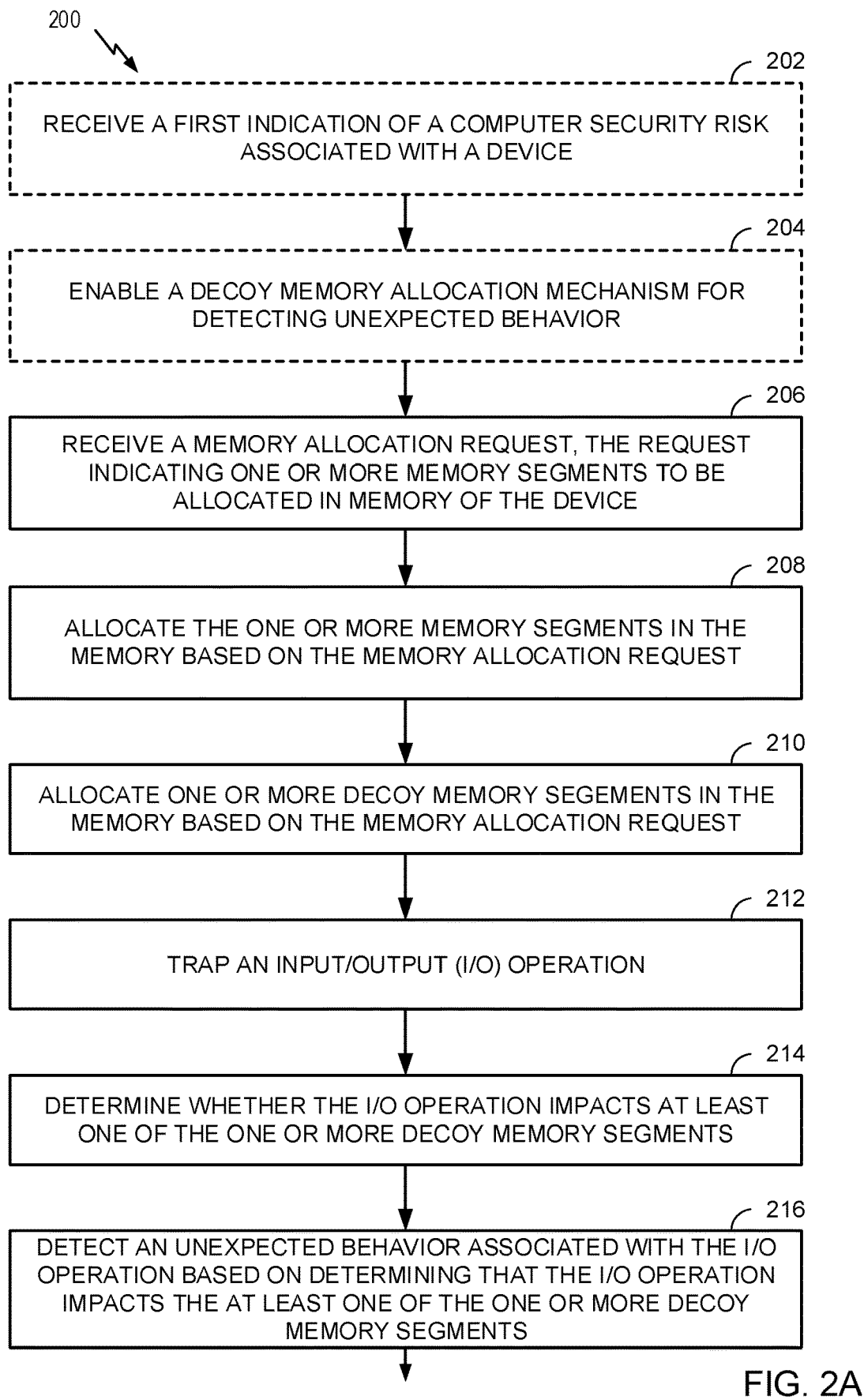
FIGS. 2A-2B illustrate example operations for detecting unexpected behavior (e.g., associated with an I/O operation), according to some embodiments.
Figure 2B:
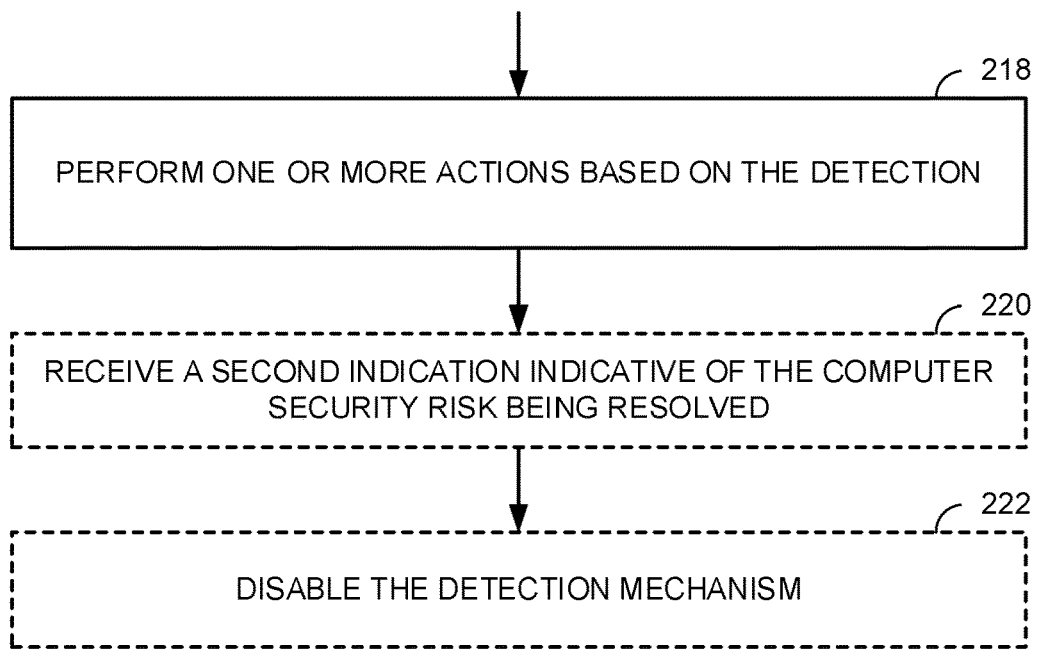

Accordingly, certain embodiments described herein relate to techniques for allocating decoy memory segments for detecting unexpected behavior occurring on a device, as further described in relation to FIGS. 2A-2B.

FIGS. 2A-2B illustrate example operations 200 for detecting unexpected behavior (e.g., associated with an I/O operation) occurring on, for example, device 100. FIG. 2B is shown as a continuation of FIG. 2A. In certain embodiments, processor 102 is configured to perform operations 200 by a set of instructions, referred to herein as anomaly detection program, which may be stored in memory 104 and executed by processor 102.

Referring to FIG. 2A, at optional step 202, the anomaly detection program, executed by processor 102, receives a first indication of a computer security risk associated with device 100. For example, device 100 may execute an intrusion detection software that may detect that device 100 may, at least potentially, be under attack. In such an example, the anomaly detection program receives an indication from the intrusion detection software indicative of an attack or a potential attack. In another example, device 100 may receive the first indication from an external entity. For example, device 100 may communicate with an intrusion detection system (IDS) that may send device 100 an indication indicative of at least a potential attack.

At optional step 204, the anomaly detection program, executed by processor 102, enables (e.g., turns on) a decoy memory allocation mechanism for helping with detecting unexpected behavior, such as an attack, associated with device 100. In certain embodiments, the decoy memory allocation mechanism refers to a set of instructions that may be part of the anomaly detection program executed by processor 102. In certain other embodiments, the decoy memory allocation mechanism may be executed as a separate program.

As described above, in certain embodiments, the decoy memory allocation mechanism may be disabled and enabled. In certain embodiments, processor 102 may enable and disable the decoy memory allocation mechanism by, respectively, setting and unsetting a configuration flag. In certain other embodiments, the decoy memory allocation mechanism may be permanently enabled for device 100, e.g., when device 100 is considered critical. For example, if device 100 is critical, any attacks on device 100 would require immediate detection and attention. In such embodiments, optional step 204 is not performed, as the decoy memory allocation mechanism is already enabled for device 100.

At step 206, processor 102 receives a memory allocation request, the request indicating one or more memory segments to be allocated in memory 104. In certain embodiments, the memory allocation request is issued by a process, in which case the request is for the one or more memory segments to be allocated to the process. As described above, a memory segment may include a memory page or a memory slab, or any other unit of allocating or dividing memory.

At step 208, the anomaly detection program allocates the one or more memory segments in memory 104, based on the memory allocation request. In certain embodiments, when the memory allocation request is issued by a process, the memory segments allocated at step 208 are allocated specifically to the process as allocated memory segments (AMSs).

Figure 3A:
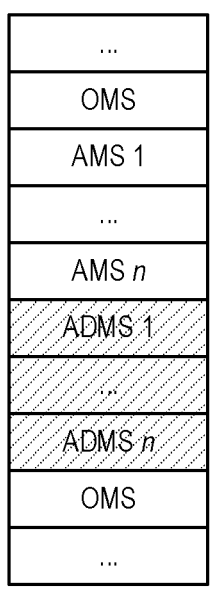
FIG. 3A illustrates a number of decoy memory segments that are contiguous with respect to a number of non-decoy memory segments, according to some embodiments.
Figure 3B:
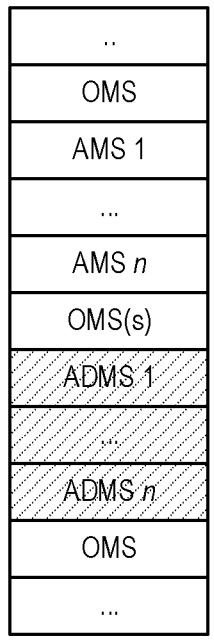
FIG. 3B illustrates a number of decoy memory segments that are not contiguous with respect to a number of non-decoy memory segments, according to some embodiments.
Figure 3C:
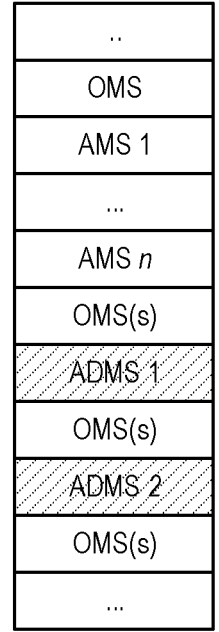
FIG. 3C illustrates a number of decoy memory segments that are not contiguous with respect to each other and not contiguous with respect to a number of non-decoy memory segments, according to some embodiments.

At step 210, the anomaly detection program allocates one or more decoy memory segments in memory 104, based on the memory allocation request. FIGS. 3A, 3B, and 3C illustrate alternative ways in which the decoy memory segments may be allocated with respect to the AMSs.

FIG. 3A illustrates an example embodiment in which the allocated decoy memory segments (ADMSs) are contiguous with respect to the AMSs. For example, FIG. 3A illustrates a plurality of memory pages including AMS 1 through AMS n, ADMS 1 through ADMS n (shaded), and other memory segments (OMSs). OMSs refer to other memory segments that are not allocated based on the memory allocation request received at step 206. For example, OMSs may be allocated to other processes or may be unallocated. AMS 1 through AMS n are memory segments allocated at step 206. In the example of FIG. 3A, ADMSs 1 through ADMS n are allocated, in step 208, in a contiguous manner with respect to the AMSs. In FIG. 3A, ADMS 1 through ADMS n are also continuous with respect to each other such that there are no AMSs or OMSs separating any ADMSs from each other. Although that need not be the case.

FIG. 3B illustrates an example of an alternative embodiment in which ADMS 1 through n are not contiguous with respect to the AMSs. As shown, there are OMS(s) that separate AMS n and ADMS 1. Similar to FIG. 3A, in FIG. 3B, ADMS 1 through ADMS n are contiguous with respect to each other such that there are no AMSs or OMSs separating any ADMSs from each other. Although that need not be the case, as shown in FIG. 3C.

FIG. 3C illustrates an example of yet another alternative embodiment in which ADMS 1 through n are not contiguous with respect to the ADSs and also not contiguous with respect to each other. As shown, ADMS 1 is not allocated immediately subsequent to AMS n. Also ADMS 2 is not contiguous with respect to ADMS 1, as there are OMS(s) separating the two.

Note that although in the examples of FIGS. 3A-3C, the ADMSs are allocated after the AMSs (i.e., the memory addresses assigned to the ADMSs are larger than the addresses assigned to the AMSs), in certain other embodiments, the ADMSs may be allocated with addresses that are smaller than addresses of the AMSs. In certain embodiments, some ADMSs may be allocated before the AMSs and some ADMSs may be allocated after the AMSs. There are a variety of ways ADMSs may be allocated with respect to the AMSs, all of which are within the scope of this disclosure.

Referring back to FIG. 2A, at step 212, the anomaly detection program traps an I/O operation. In certain embodiments, the I/O operation is issued by the process that also issued the memory allocation request received at step 206. In certain embodiments, trapping an I/O operation refers to issuing an interrupt intended to initiate a context switch, for example, to the anomaly detection program.

At step 214, the anomaly detection program determines whether the I/O operation impacts at least one of the one or more ADMSs. As described above, in certain embodiments, impact to the ADMSs include any read or write to the ADMSs. To illustrate this with an example, the I/O operation trapped at step 212 may include a write operation with a starting address associated with AMS n in FIG. 3A. However, the payload associated with the write operation may be large enough such that writing the payload, starting from AMS n, would at least overwrite ADMS 1 and possibly the other ADMSs. In other words, a part of the payload would have to be written to at least ADMS 1. Therefore, in certain embodiments, the determination of whether at least one of the ADMSs would be impacted is based on the starting address of the trapped I/O operation and the write payload or the read size.

Another example of an impact to at least one of the ADMSs is when the trapped I/O operation has a starting address associated with one or more ADMSs. For example, in the example of FIG. 3A, the trapped I/O operation may include a read or write request with a starting address associated with ADMS 1.

At step 216, the anomaly detection program detects an unexpected behavior associated with the I/O operation based on determining that the I/O operation impacts the at least one of the ADMSs. For example, the unexpected behavior may be associated with an I/O operation issued by a malicious or non-malicious process.

As shown in FIG. 2B, at step 218, device 100 performs one or more actions based on the detection. For example, once the unexpected behavior is detected, information associated with the I/O operation may be further examined by the anomaly detection program, a user (e.g., system administrator), an intrusion detection software executing on device 100, an IDS that is in communication with device 100, etc.

The information associated with the I/O operation may include one or more of the timing of when the I/O operation was issued, the payload, the starting address of the I/O, the information that is read from or written to based on the I/O, if the I/O is performed, etc. As described above, when the unexpected behavior relates to a security attack, information associated with the I/O operation may help with learning how the attacker is operating, the implementation details of how the attacker is attempting to gain control of the device, etc. In such cases, the one or more actions may, therefore, include one or more of further examining information associated with the I/O operation, blocking the I/O operation, blocking the process that issued the I/O operation altogether, etc. In other examples, the one or more actions may include allowing the I/O operation and other subsequent I/O operations that show unexpected behavior to pass through in order to turn device 100 into a "honeypot" to learn more about the attacker, in cases where the I/O operations are issued by a malicious process. A honeypot is a computer or computer system intended to mimic likely targets of cyberattacks.

At optional step 220, the anomaly detection program receives a second indication indicative of the computer security risk being resolved or ending (e.g., disappearing). For example, the anomaly detection program receives the indication from an intrusion detection software executing on device 100 or an IDS in communication with device 100.

At optional step 222, the anomaly detection program disables the decoy memory allocation mechanism. For example, the anomaly detection program unsets a configuration flag such that, in response to receiving a subsequent memory allocation request, processor 102 only allocates the memory segments requested by the memory allocation request and not any decoy memory segments.

In device 100, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of device 100. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of detecting unexpected behavior associated with a process, comprising:
   receiving a memory allocation request, the memory allocation request indicating one or more memory segments to be allocated in memory of a computing system;
   allocating the one or more memory segments in the memory based on the memory allocation request;
   allocating one or more decoy memory segments in the memory based on the memory allocation request;
   trapping an input/output (I/O) operation prior to detecting an unexpected behavior associated with the I/O operation, the I/O operation including a payload and a starting address associated with the one or more memory segments;
   detecting the unexpected behavior associated with the I/O operation before the decoy memory is updated by determining, based on the starting address and a size of the payload, that the I/O operation impacts at least one of the one or more decoy memory segments; and
   performing one or more actions based on the detecting.

2. The method of claim 1, wherein the allocated one or more decoy memory segments are contiguous with respect to the allocated one or more memory segments.

3. The method of claim 1, wherein the payload comprises a write payload of the trapped I/O operation.

4. The method of claim 1, wherein the allocated one or more decoy memory segments are contiguous with respect to each other.

5. The method of claim 1, wherein the payload indicates a read size of the trapped I/O operation.

6. The method of claim 1, wherein a starting address associated with the allocated one or more decoy memory segments is larger than the starting address associated with the allocated one or more memory segments.

7. The method of claim 1, further comprising:
   receiving a first indication of a computer security risk associated with the computer system; and
   prior to receiving the memory allocation request, enabling a decoy memory allocation mechanism for use in detecting unexpected behavior.

8. The method of claim 7, further comprising:
   receiving a second indication indicative of the computer security risk being resolved; and
   disabling the decoy memory allocation mechanism.

9. The method of claim 1, wherein:
   the unexpected behavior is a computer security attack; and
   performing the one or more actions comprises at least one of examining:
      a timing associated with the I/O operation;
      the payload of the I/O operation; and
      information associated with the payload.

10. A computer system, comprising:
   a memory comprising executable instructions; and
   a processor in data communication with the memory and configured to execute the executable instructions to cause the computer system to:
      receive a memory allocation request, the memory allocation request indicating one or more memory segments to be allocated in the memory;
      allocate the one or more memory segments in the memory based on the memory allocation request;
      allocate one or more decoy memory segments in the memory based on the memory allocation request;

trap an input/output (I/O) operation prior to detecting an unexpected behavior associated with the I/O operation, the I/O operation including a payload and starting address associated with the one or more memory segments;

detect the unexpected behavior associated with the I/O operation by determining, based on the starting address and a size of the payload, that the I/O operation impacts at least one of the one or more decoy memory segments before the decoy memory is updated; and perform one or more actions based on the detection.

11. The computer system of claim 10, wherein the allocated one or more decoy memory segments are contiguous with respect to the allocated one or more memory segments.

12. The computer system of claim 10, wherein the payload comprises a write payload or read size of the trapped I/O operation.

13. The computer system of claim 10, wherein the processor is further configured to cause the computer system to:

receive a first indication of a computer security risk associated with the computer system; and prior to receiving the memory allocation request, enable a decoy memory allocation mechanism for use in detecting unexpected behavior.

14. The computer system of claim 13, wherein the processor is further configured to cause the computer system to:

receive a second indication indicative of the computer security risk being resolved; and disable the decoy memory allocation mechanism.

15. The computer system of claim 10, wherein:

the unexpected behavior is a computer security attack; and performing the one or more actions comprises at least one of examining:

a timing associated with the I/O operation;

the payload of the I/O operation; and information associated with the payload.

16. A non-transitory computer readable medium having instructions stored thereon that, when executed by a computer system, cause the computer system to perform a method comprising:

receiving a memory allocation request, the memory allocation request indicating one or more memory segments to be allocated in memory of the computing system;

allocating the one or more memory segments in the memory based on the memory allocation request;

allocating one or more decoy memory segments in the memory based on the memory allocation request;

trapping an input/output (I/O) operation prior to detecting an unexpected behavior associated with the I/O operation, the I/O operation including a payload and starting address associated with the one or more memory segments;

detecting the unexpected behavior associated with the I/O operation before the decoy memory is updated by determining, based on the starting address and a size of the payload, that the I/O operation impacts at least one of the one or more decoy memory segments; and performing one or more actions based on the detecting.

17. The non-transitory computer readable medium of claim 16, wherein the allocated one or more decoy memory segments are contiguous with respect to the allocated one or more memory segments.

18. The non-transitory computer readable medium of claim 16, wherein the method further comprises:

receiving a first indication of a computer security risk associated with the computer system; and prior to receiving the memory allocation request, enabling a decoy memory allocation mechanism for use in detecting unexpected behavior.

19. The non-transitory computer readable medium of claim 18, wherein the method further comprises:

receiving a second indication indicative of the computer security risk being resolved; and disabling the decoy memory allocation mechanism.

20. The non-transitory computer readable medium of claim 16, wherein:

the unexpected behavior is a computer security attack; and performing the one or more actions comprises at least one of examining:

a timing associated with the I/O operation;

the payload of the I/O operation; and information associated with the payload.

* * * * *